US007165962B2

(12) United States Patent
Hanson

(10) Patent No.: US 7,165,962 B2
(45) Date of Patent: Jan. 23, 2007

(54) WEB HANDLING ROLL STAND

(76) Inventor: Dana R. Hanson, 399 Cranesbill Dr., West Chicago, IL (US) 60185

( * ) Notice: Subject to any disclaimer, the term of this patent is extended or adjusted under 35 U.S.C. 154(b) by 234 days.

(21) Appl. No.: 11/018,300

(22) Filed: Dec. 21, 2004

(65) Prior Publication Data

US 2006/0134258 A1    Jun. 22, 2006

(51) Int. Cl.
B29C 47/90    (2006.01)
(52) U.S. Cl. ............... 425/194; 425/327; 425/363; 425/367
(58) Field of Classification Search ............... 425/194, 425/327, 335, 363, 367
See application file for complete search history.

(56) References Cited

U.S. PATENT DOCUMENTS

| 1,918,356 | A |   | 7/1933  | Vogt |
|-----------|---|---|---------|------|
| 1,956,952 | A |   | 1/1934  | Iversen |
| 2,067,973 | A |   | 1/1937  | McIlvried |
| 2,226,500 | A |   | 12/1940 | Matthews |
| 2,343,554 | A |   | 3/1944  | Hudson |
| 3,035,684 | A |   | 5/1962  | Conner |
| 3,170,344 | A |   | 2/1965  | Marrs |
| 3,580,033 | A |   | 5/1971  | Gay |
| 3,580,036 | A |   | 5/1971  | Zayats |
| 3,581,340 | A | * | 6/1971  | Thieme ............... 425/363 |
| 3,844,463 | A |   | 10/1974 | Copp |
| 4,194,872 | A | * | 3/1980  | Hinterkeuser et al. ...... 425/327 |
| 4,408,974 | A | * | 10/1983 | Comerio ............... 425/194 |
| 4,655,703 | A | * | 4/1987  | Heise ............... 425/335 |
| 4,695,239 | A | * | 9/1987  | Klepsch et al. ............... 425/194 |
| 4,784,596 | A | * | 11/1988 | Heise ............... 425/194 |
| 5,087,191 | A | * | 2/1992  | Heise et al. ............... 425/335 |
| 5,761,945 | A |   | 6/1998  | Vandenbroucke |
| 6,045,349 | A | * | 4/2000  | Ishida et al. ............... 425/335 |
| 6,575,726 | B1 |  | 6/2003  | Nissel |
| 6,619,097 | B1 |  | 9/2003  | Garth ............... 72/384 |
| 2004/0035549 | A1 | | 2/2004 | Ederwein ............... 164/428 |
| 2004/0065131 | A1 | | 4/2004 | Schmauder ............... 72/149 |

FOREIGN PATENT DOCUMENTS

| DE | 3839110 A | 6/1989 |
| EP | 0 342 176 A | 11/1989 |
| JP | 59-113963 | 6/1984 |

OTHER PUBLICATIONS

Brochure entitled "World Class Sheet Extrusion Systems", PTI Processing Technologies, Inc., Aurora, IL (date unknown).
Brochure entitled "Sheet Producer's Toolbox™", PTI Processing Technologies, Inc., Aurora, IL (date unknown).

* cited by examiner

Primary Examiner—James P. Mackey
(74) Attorney, Agent, or Firm—McCracken & Frank LLP

(57) ABSTRACT

A telescoping roll stand for use in an extrusion line includes a linkage connecting one or more auxiliary rolls in a spatial relationship relative to each other and other auxiliary web processing components, including conveyors, load cell rolls, draw rolls, and other web handling components, when one of the auxiliary rolls is shifted in relation to a primary roll.

20 Claims, 5 Drawing Sheets

WEB HANDLING ROLL STAND

CROSS REFERENCE TO RELATED APPLICATIONS

Not applicable.

REFERENCE REGARDING FEDERALLY SPONSORED RESEARCH OR DEVELOPMENT

Not applicable.

SEQUENTIAL LISTING

Not applicable.

BACKGROUND OF THE INVENTION

1. Field of the Invention

The present invention relates to a roll stand for use in a continuous polymer web extrusion line, and more specifically to a roll stand having an auxiliary section shiftable in relation to a primary section.

2. Description of the Background of the Invention

During the process of extruding a molten polymer web, it is customary to feed the extrudate into a roll stand having at least one primary chilled roll in order to cool the extrudate below a solidification temperature thereof. Under certain conditions such as high extrusion velocities, it may be desirable to have one or more auxiliary chilling rolls in order to attain the desired cooling. Under such circumstances, it is often convenient to shift the auxiliary rolls away from or toward the primary roll during the start up process of a new web and then re-adjust the distance between the primary and auxiliary rolls after the web is sufficiently stable.

Nissel U.S. Pat. No. 6,575,726 discloses a roll stand for use in a polymer web extrusion line including a slot extrusion die, a primary roll stack, a plurality of auxiliary rolls, and a pair of draw rolls. The auxiliary rolls are laterally shiftable in relation to the primary roll stack in order to provide adjustability. A mechanical linkage connects the auxiliary rolls to each other in order to maintain a constant spacing therebetween when the auxiliary rolls are shifted in relation to the primary rolls.

However, when shifting the rolls in relation to each other while a web is passing thereover, it is usually necessary to adjust the rotational velocity of each roll during the movement in order to prevent sagging or bunching of the web on either side of the rolls being shifted. It is desirable to have a simple and efficient method of minimizing the amount of adjustment to the rotational velocity of the various rolls in a roll train in order to facilitate start-up adjustments or to perform maintenance on portions of the roll stand while the web is being passed therethrough.

SUMMARY OF THE INVENTION

In accordance with one aspect of the invention, a telescoping roll stand for transferring an elongate web includes a primary roll stack having a plurality of primary rolls carried by a primary carriage frame and an auxiliary carriage frame adjacent the primary carriage frame. The auxiliary carriage frame is shiftable in relation to the primary carriage frame between an open position and a closed position. The auxiliary carriage frame carries an auxiliary roll stack and draw rolls and maintains the auxiliary roll stack and draw rolls in a fixed relative position with respect to each other when shifted between the open and closed positions.

In accordance with another aspect of the invention, an apparatus for transferring a polymer web includes a primary roll for accepting the web from an extrusion die, an auxiliary roll proximate the primary roll and shiftable in relation thereto, a pair of draw rolls in a spaced relation from the auxiliary roll, and a linkage connecting the auxiliary roll and the draw rolls. The linkage maintains the spaced relation between the auxiliary roll and the draw rolls when the auxiliary roll shifts.

In accordance with another aspect of the invention, a telescoping roll stand for transferring an elongate web includes a primary roll stack carried by a primary carriage frame, and an auxiliary carriage frame adjacent to the primary carriage frame and carrying an auxiliary roll stack and a conveyor. The auxiliary carriage frame is shiftable relative to the primary carriage frame between an open position and a closed position, and the auxiliary carriage frame maintains a fixed spatial relationship between the auxiliary roll stack and conveyor when the auxiliary carriage frame shifts between the open and closed positions.

DETAILED DESCRIPTION OF THE PREFERRED EMBODIMENTS

Figure 1:
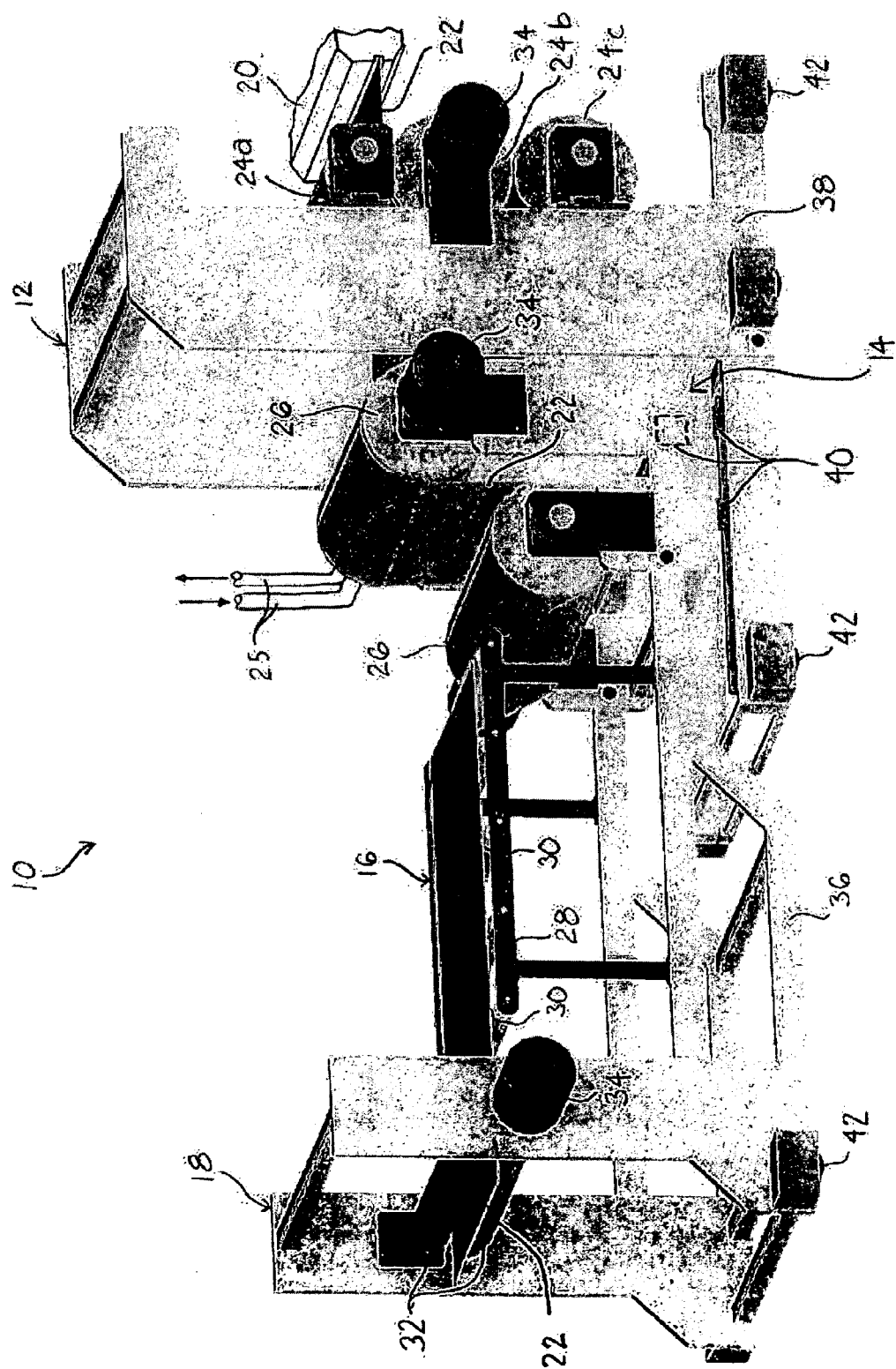
FIG. 1 is an isometric schematic view of a telescoping roll stand with an auxiliary carriage frame in a forward, closed position and a primary carriage frame in a forward position directly adjacent an extrusion die.
Figure 2:
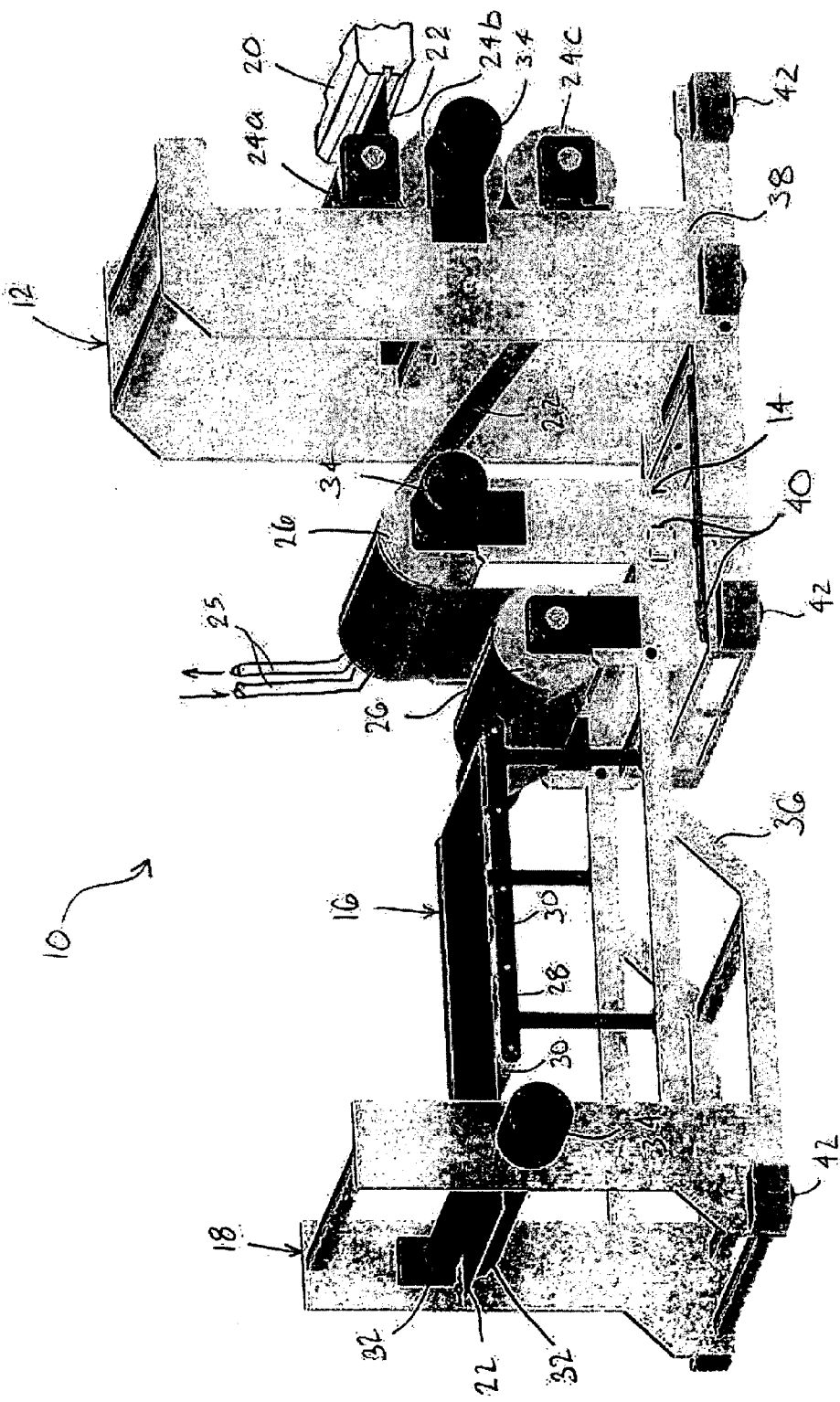
FIG. 2 is an isometric schematic view of the roll stand shown in FIG. 1 with the auxiliary carriage frame in a rearward, open position and the primary carriage frame in the forward position.

Turning now to FIGS. 1 and 2, a telescoping roll stand 10 includes a primary roll stack 12, an auxiliary roll stack 14, a conveyor 16, and a draw roll stand 18. A flat extrusion die 20 in communication with an extruder (not shown) feeds a continuous stream of molten polymer forming a web 22 to the nip between a nip roll 24a and a primary roll 24b on the primary roll stack 12. A second primary roll 24c keeps the web in contact with the primary roll 24b for a pre-selected radial distance. The auxiliary roll stack 14 includes a plurality of auxiliary rolls 26 that transfer the web 22 from the primary roll stack 12 toward the conveyor 16 and may provide additional cooling, reheating, or no temperature change to the web. The primary rolls 24b, 24c and/or auxiliary rolls 26 may optionally be chilled or heated using any convenient means such as water or other suitable and conventional heat exchange medium to either cool or heat the web as it passes thereover. Hoses or pipes 25 in communication with the rolls 24a, 24b, 26 provide a supply of the heat exchange medium to the rolls to maintain a selected temperature in any conventional manner. The conveyor 16 includes a frame 28 carrying a plurality of conveyor rolls 30 journaled thereto that transfer the web from the auxiliary rolls 26 toward a pair of draw rolls 32 journaled to the draw roll stand 18. Each roll 24a, 24b, 24c, 26, 30, 32 is preferably driven by a different drive unit 34, such as a computer controlled servo motor, but any drive mechanism able to provide sufficient selective rotational velocity control to transfer the web 22 from the die 20 to the draw rolls 32 without breaking may be used. Alternatively, some or all of the conveyor rolls 30 may be free rolling without being driven by a drive unit 34.

Each of the auxiliary roll stack 14, conveyor 16, and draw roll stand 18 is secured to an auxiliary carriage frame 36, and the primary roll stack 12 is secured to a primary carriage frame 38. The auxiliary carriage frame 36 is laterally shiftable in relation to the primary carriage frame 38 between a forward (i.e., extended), closed position shown in FIG. 1 and a rearward (i.e., retracted), open position shown in FIG. 2. In addition, the primary roll frame 38 may be shifted between a forward position directly adjacent to the die 2 (as shown in FIGS. 1 and 2) and a rearward position spaced from the die. The auxiliary carriage frame 36 links together and maintains a constant space between each of the auxiliary rolls 26, conveyor rolls 30, and draw rolls when the frame 36 is shifted. The auxiliary carriage frame 36 may be shifted using any convenient drive means 40, such as a worm drive, rack and pinion, telescoping hydraulic cylinders, or individual servo drives. Preferably, each of the auxiliary and primary carriage frames 36 and 38 includes some sort of wheel 42 or roller to facilitate easier shifting of the entire roll stand 10 and the individual frames 36, 38.

The drive units 34 vary the rotational velocity of the rolls 26, 30, 32 as the auxiliary carriage frame 36 is shifted toward or away from the primary carriage frame 38 to provide a constant global tangential velocity of the rolls so that the web does not stretch or sag. Each of the rolls 26, 30, 32 preferably is adjusted to have the same change in tangential velocity as the auxiliary carriage frame 36 is shifted in relation to the primary carriage frame 38 because of the fixed spacing between each of the rolls 26, 30, and 32. The tangential velocity of the rolls 26, 30, 32 is adjusted to compensate for positive or negative velocity of the primary carrier frame 38 relative to the auxiliary carrier frame 36 by computer controls if the drive units 34 are computer controlled servo motors. Alternatively, the rolls 26, 30, and 32 may maintain a constant rotational velocity, and the rotational velocities of the rolls 24a–c may be varied to compensate for the relative velocity of the primary carrier frame 38 relative to the auxiliary carrier frame 36.

The roll stand 10 is not limited to the precise use and arrangement described herein, and alternative arrangements and uses for a telescoping roll stand 10 are also contemplated. For example, the primary roll stack 12 may be readily adapted to accept a non-woven blown fiber extruded web or other types of continuous materials. Different web materials other than polymer may also be passed through the roll stand 10.

In another alternative arrangement (not shown), either the conveyor 16 or the draw roll stand 18 may be omitted from the auxiliary carriage frame 36, and any number of auxiliary rolls 26 may be used. Further, relative positions between the various rolls 24, 26, 30, 32 other than those shown may be used. In addition, different conveyor mechanisms such as a single roll, a belt, an air cushion, etc. could be used instead of or in addition to the conveyor 16. The auxiliary carriage frame may carry additional processing mechanisms, such as additional cooling devices, coating devices, etc., in a preselected spacing from the other processing mechanisms in the same manner as described herein.

Figure 3:
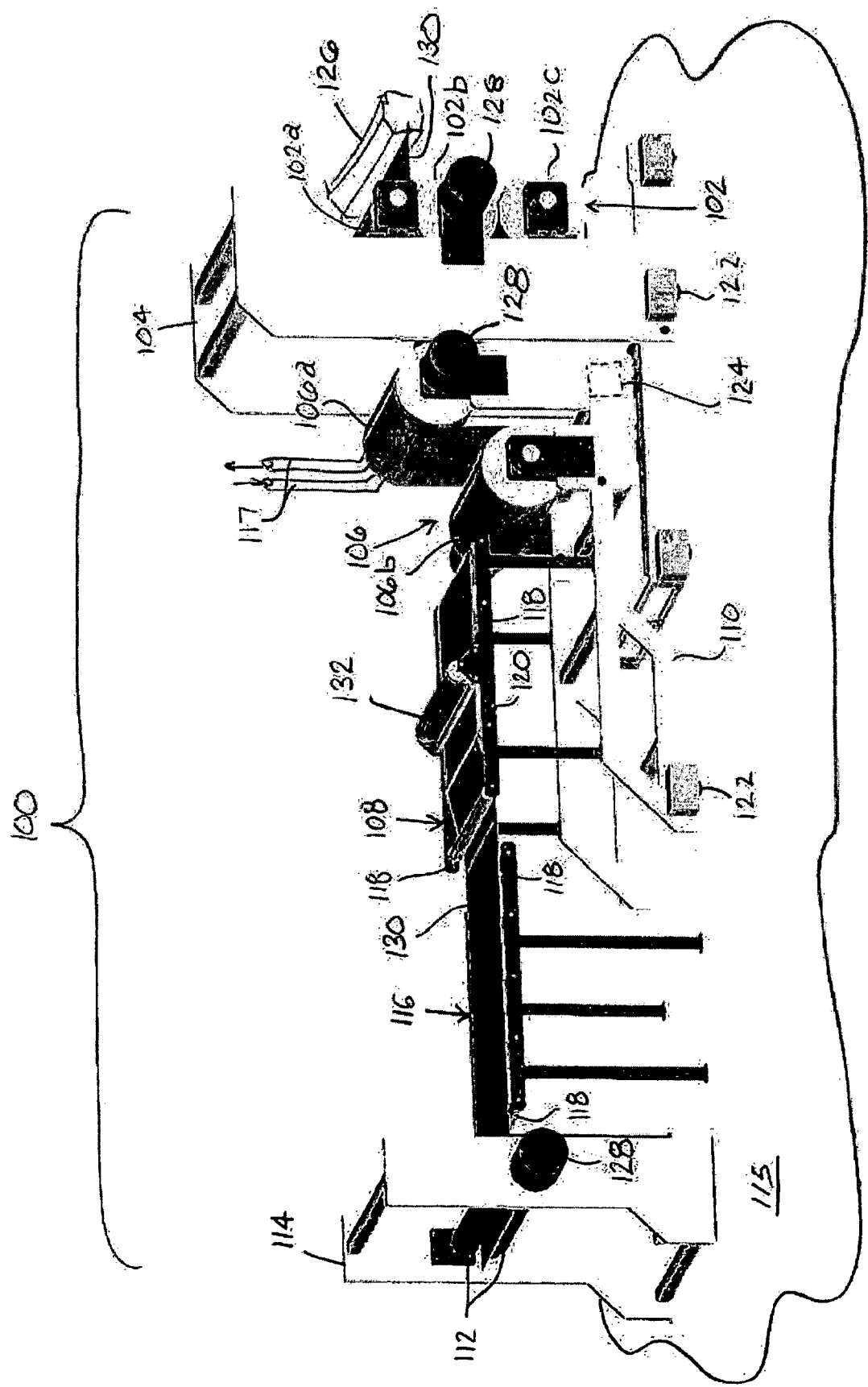
FIG. 3 is an isometric schematic view of another telescoping roll stand with an auxiliary carriage frame in a forward, closed position and a primary carriage frame in a forward position directly adjacent to an extrusion die.
Figure 4:
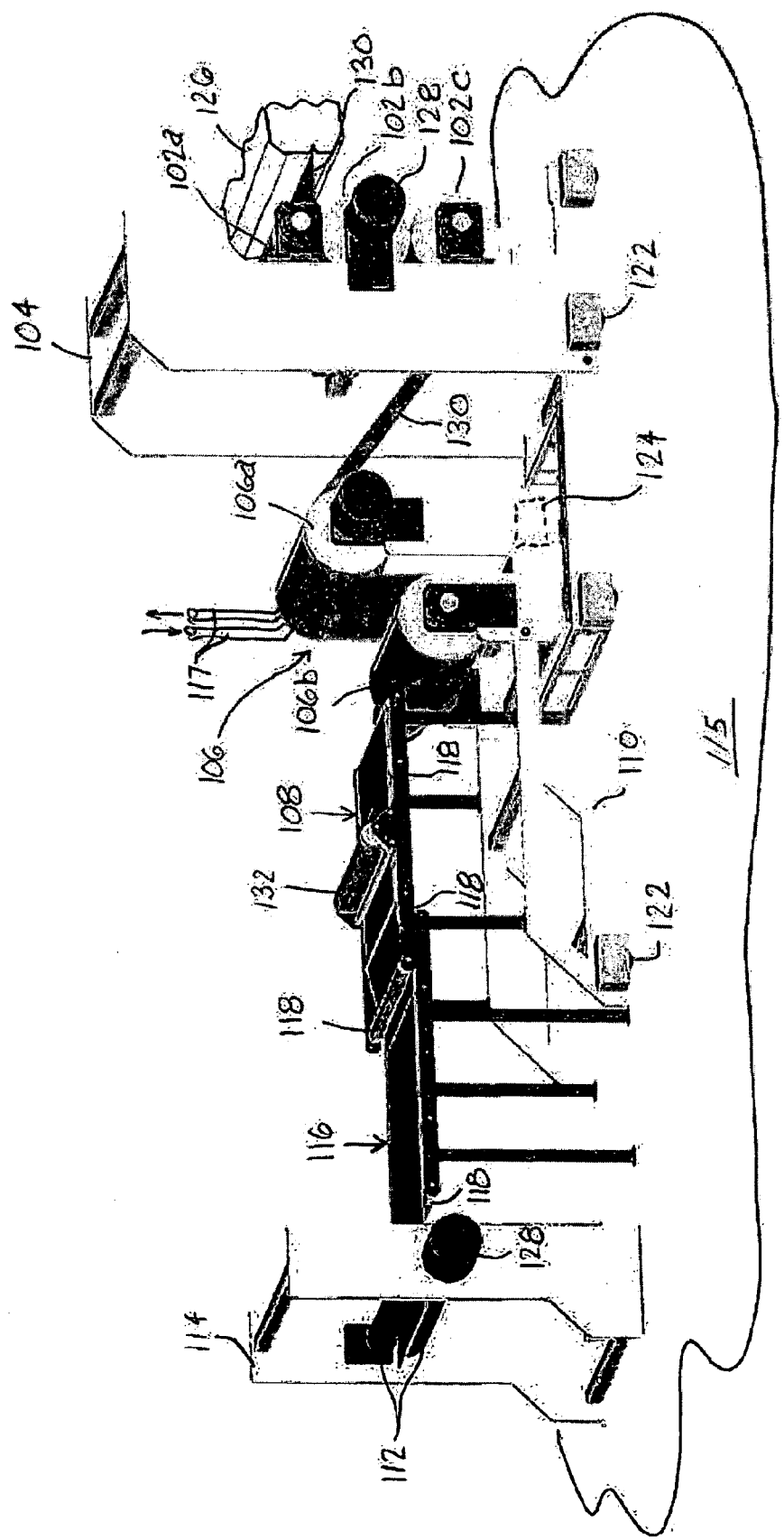
FIG. 4 is an isometric schematic view of the roll stand shown in FIG. 3 with the auxiliary carriage frame in a rearward, open position and the primary carriage in the forward position.
Figure 5:
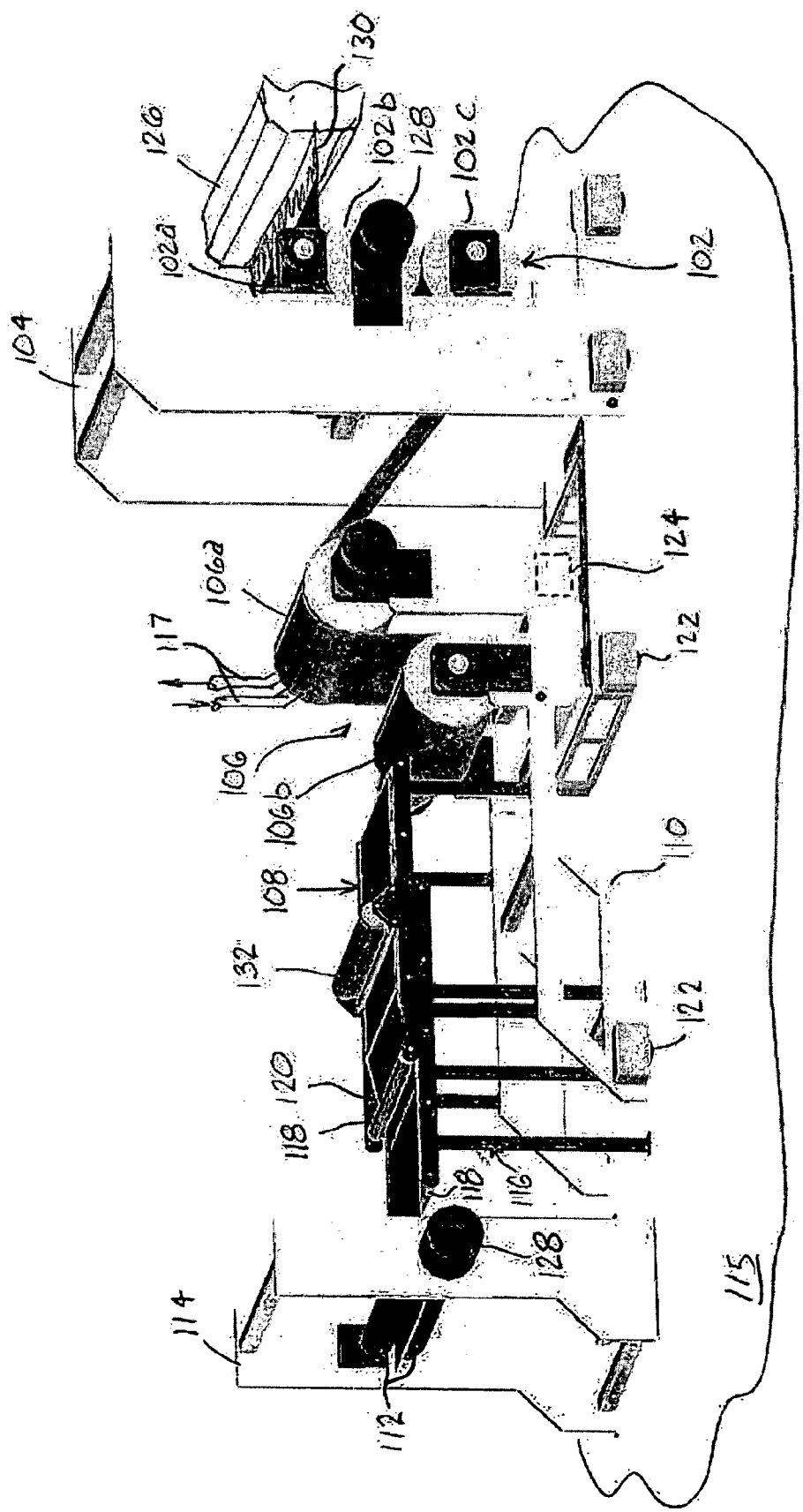
FIG. 5 is an isometric schematic view of the roll stand shown in FIG. 3 with the auxiliary carriage in the rearward, open position and the primary carriage in a rearward position spaced from the extrusion die.

In FIGS. 3–5, another telescoping roll stand 100 includes a primary roll stack 102 carried by a primary carriage frame 104, an auxiliary roll stack 106 and a conveyor 108 carried by an auxiliary carriage frame 110, a pair of draw rolls 112 carried by a draw roll frame 114, and a conveyor 116 between the draw rolls and the conveyor 108. The draw roll frame 114 is fixedly mounted on or secured to the ground 115 or other support surface by any convenient means, such as friction, fasteners, adhesive, etc., and the conveyor 116 may be secured directly to the draw roll frame or fixed to the ground in a pre-selected position with respect to the draw rolls as shown in FIGS. 3–5. The primary roll stack 102 includes primary rolls 102a, 102b, 102c. The auxiliary roll stack 106 includes auxiliary rolls 106a, 106b, which are journaled to the auxiliary carriage frame 110. Inlet/outlet lines 117 connected to the rolls 106a, 106b circulate thermal control fluids in rolls 106a, 106b to provide heating or cooling temperature control of the rolls. The conveyor 108 includes conveyor rolls 118 journaled to a conveyor frame 120, which is fixedly secured to the auxiliary carriage frame 110. Each of the primary carriage frame 102 and the auxiliary carriage frame 110 is carried by rollers 122 so that both the primary and auxiliary carriage frames may be shifted across the floor 115 or other support surface along an axis of the web. A drive unit, shown schematically at 124, can be actuated to shift the auxiliary carriage frame 110 between a forward (i.e., extended) position directly adjacent to the primary carriage frame 104 (FIG. 3) and rearward (i.e., retracted) position spaced from the primary carriage frame (FIGS. 4 and 5). In addition, both the primary and auxiliary carriage frames 104, 110 may be shifted together or independently between a forward position directly adjacent to an extrusion die 126 (FIGS. 3 and 4) and a rearward position spaced from the extrusion die and nearer to the draw roll frame 114. The auxiliary carriage frame 110 maintains a fixed spatial relationship between each of the auxiliary rolls 106a, 106b, and the conveyor 108 and conveyor rolls 118 when either or both of the primary and auxiliary carriage frames 104, 110 are shifted across the floor 115.

Each of the rolls 102a, 102b, 102c, 106a, 106b, and 112 includes a rotational drive unit 128 to pass the web 130 from the extrusion die 126 to a position downstream of the draw rolls. A rotational speed of each roll 102a, 102b, 102c, 106a, 106b, and 112 is controlled by known methods, such as computer control or mechanical gearing linkages, to maintain a uniform global tangential velocity of the rolls and a web 130 passing therethrough in order to minimize and/or control tension differentials in the web between the primary rolls and the draw rolls in a similar manner as previously described herein. In addition, a load cell roll 132 or other tension sensing and controlling device, such as a dancer arm, may be carried by the conveyor frame 120 and used to control the tension in the web 128 and to sense velocity changes in the web in order to adjust and/or maintain the rotational velocities of the rolls 102a, 102b, 102c, 106a, 106b, and 112 at a desired speed to pass the web therethrough without causing sagging or bunching in the web.

The conveyor 108 is vertically offset above the conveyor 116 an amount sufficient to allow the conveyor 108 to pass over the conveyor 116 such that the web transitions smoothly from underneath the conveyor roll 118 nearest the draw roll frame 114 (or in any similar fashion so as to permit stable conveyance of the web) to a position on top of a roll 118 on the conveyor stand 116. Preferably, the conveyor rolls 118 are allowed to freely rotate when the web 130 passes thereover, although the rolls 118 may be driven by drive units with appropriate rotational velocity controls as previous described herein.

The roll stand 100 provides a convenient way for different sections along the roll stand to be serviced during operation thereof by creating space to access different sections when the auxiliary carriage frame is shifted between the forward and rearward positions. Rotational velocity sensing and control apparatus adjust the rotational velocities of the rolls 106a, 106b as the auxiliary carriage frame 110 is shifted between the open and closed positions in order to prevent sagging and/or bunching of the web 130 in a similar manner as described previously herein. Causing the conveyor 108 to be capable of overlapping the conveyor 116 provides additional flexibility in constrained spaces by allowing the auxiliary carriage to be shifted to the open, rearward position in web processing lines where space is limited, such as when of other components or equipment (not shown) located immediately downstream from the draw rolls 112 limit the available space for shifting.

Other arrangements and uses of the preferred embodiments of the telescoping roll stands described herein that are encompassed within the scope of the impending claims are specifically included.

I claim:

1. A telescoping roll stand for transferring an elongate web, the roll stand comprising:
   a primary roll stack including a plurality of primary rolls carried by a primary carriage frame;
   an auxiliary carriage frame adjacent the primary carriage frame and shiftable in relation thereto between an open position and a closed position;
   wherein the auxiliary carriage frame carries an auxiliary roll stack and draw rolls; and
   wherein the auxiliary carriage frame maintains the auxiliary roll stack and draw rolls in a fixed relative position with respect to each other when shifted between the open and closed positions.

2. The roll stand of claim 1, and further comprising a drive between the primary carriage frame and the auxiliary carriage frame for shifting the auxiliary carriage frame between the open and closed positions.

3. The roll stand of claim 2, wherein a rotational drive for an auxiliary roll on the auxiliary roll stack adjusts a rotational velocity thereof while the auxiliary frame is shifted between the open and closed positions to match a tangential velocity of the auxiliary roll with an exit velocity of the web passing from the primary rolls.

4. The roll stand of claim 1, wherein one of the rolls is cooled.

5. The roll stand of claim 4, wherein the one of the primary rolls is cooled.

6. The roll stand of claim 4, wherein one of the auxiliary rolls is cooled.

7. The roll stand of claim 1, wherein one of the rolls is heated.

8. The roll stand of claim 1, wherein the auxiliary carriage frame carries a conveyor and the position of the conveyor is fixed with respect to the auxiliary roll stack when shifted between the open and closed positions.

9. The roll stand of claim 8, wherein the conveyor includes a plurality of conveyor rolls.

10. The roll stand of claim 1, wherein the auxiliary roll stack includes a plurality of auxiliary rolls.

11. An apparatus for transferring a polymer web, the apparatus comprising:
   a primary roll for accepting the web from an extrusion die;
   an auxiliary roll proximate the primary roll and shiftable in relation thereto;
   a pair of draw rolls in a spaced relation from the auxiliary roll; and
   a linkage connecting the auxiliary roll and the draw rolls;
   wherein the linkage maintains the spaced relation between the auxiliary roll and the draw rolls when the auxiliary roll shifts.

12. The apparatus of claim 11, and further comprising a conveyor connected to the linkage between the auxiliary roll and the draw rolls, wherein the linkage maintains the conveyor in a fixed spatial relation to the auxiliary roll when the auxiliary roll shifts in relation to the primary roll.

13. The apparatus of claim 11, and further comprising a second primary roll, wherein the auxiliary roll is shiftable in relation to both the first and second primary rolls.

14. The apparatus of claim 13, and further comprising a second auxiliary roll adjacent the first auxiliary roll and shiftable in relation to the primary rolls, wherein each auxiliary roll is connected to the linkage.

15. The apparatus of claim 12, wherein the conveyor includes a plurality of conveyor rolls.

16. The apparatus of claim 11, wherein at least one of the primary and auxiliary rolls is cooled while transferring the web.

17. A telescoping roll stand for transferring an elongate web, the roll stand comprising:
   a primary roll stack carried by a primary carriage frame;
   an auxiliary carriage frame adjacent to the primary carriage frame and carrying an auxiliary roll stack and a conveyor;
   wherein the auxiliary carriage frame is shiftable relative to the primary carriage frame between an open position and a closed position; and
   wherein the auxiliary carriage frame maintains a fixed spatial relationship between the auxiliary roll stack and conveyor when the auxiliary carriage frame shifts between the open and closed positions.

18. The roll stand of claim 17, and further comprising a stationary frame carrying draw rolls;
   wherein the auxiliary carriage frame is between the primary frame and the draw rolls; and
   wherein the primary and auxiliary carriage frames are shiftable relative to the draw rolls.

19. The roll stand of claim 18, and further comprising a second conveyor in fixed spatial relation adjacent the draw rolls, wherein the first recited conveyor is capable of overlapping the second conveyor in the open position.

20. The roll stand of claim 17, and further comprising a load cell for contacting the web, wherein the load cell tensions the web and provides control data for controlling a tangential speed of any rolls on the roll stand driven by a drive other than the web.

* * * * *